Patented Mar. 16, 1948

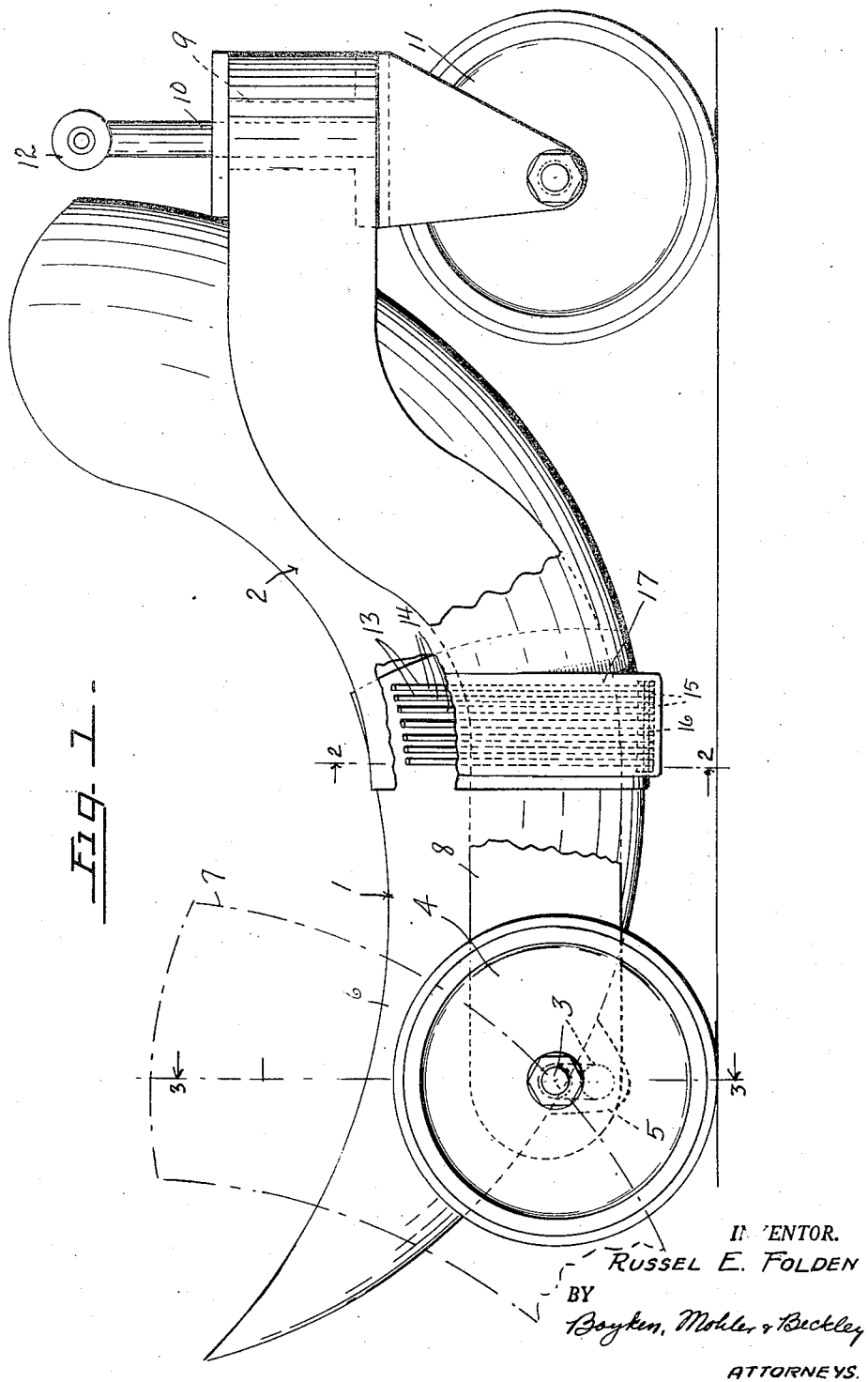

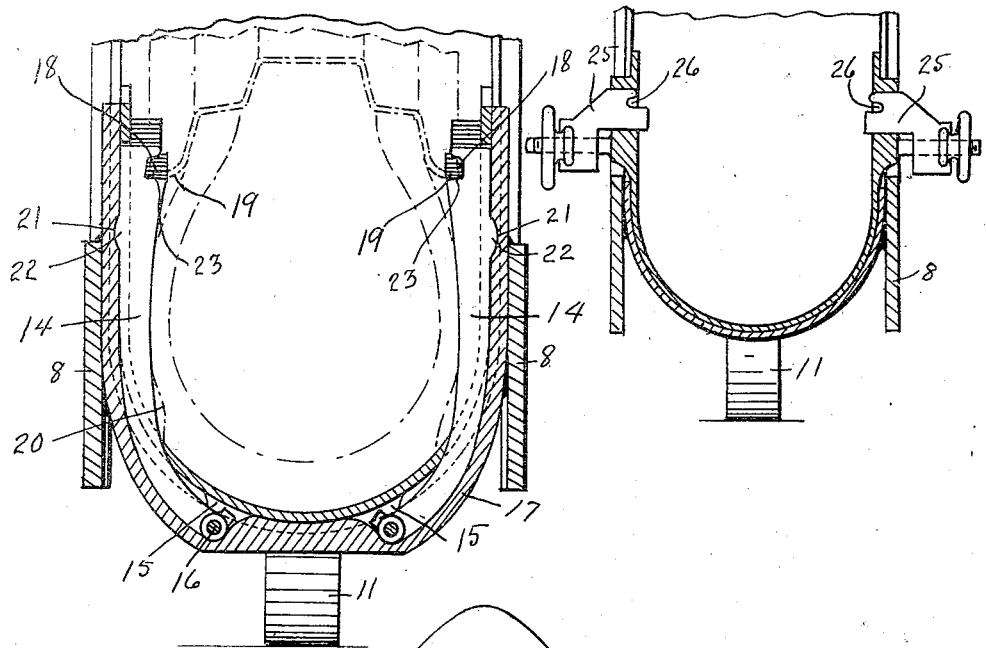
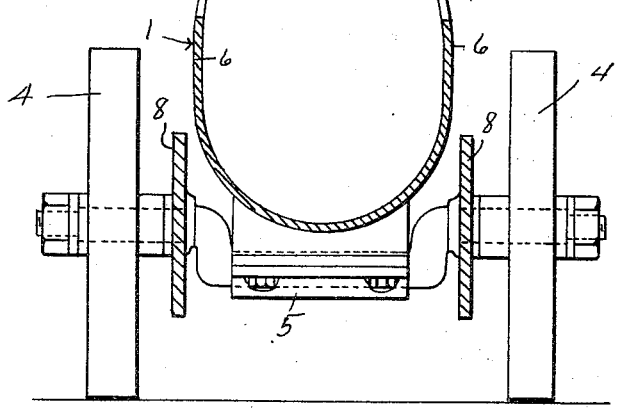

2,437,811

UNITED STATES PATENT OFFICE 2,437,811

EMERGENCY TIRE CARRIER

Russel E. Folden, Oakland, Calif.

Application March 26, 1945, Serial No. 584,937

8 Claims. (Cl. 280—61)

This invention relates to an emergency carrier for supporting a deflated, rim-mounted pneumatic tire that is on a vehicle.

One of the objects of the invention is the provision of an improved carrier that is adapted to be quickly secured in a position supporting a deflated, rim-mounted pneumatic tire that is on a vehicle so that the vehicle may be driven over the road without injury to such tire or rim.

Another object of the invention is the provision of an emergency wheel mounted carrier that is adapted to be quickly positioned under the deflated tire on a vehicle and that is adapted to support the weight of the vehicle normally on such tire so that the tire is free from said weight and so that the vehicle, such as an automobile, may be driven over the road without injury to the tire or rim.

A still further object of the invention is the provision of an emergency wheel mounted carrier that is provided with a wheel elevator adapted to lift the wheel carrying a deflated tire off the ground and which carrier is provided with improved locking means adapted releasably to lock the tire and rim onto the carrier when the wheel is so elevated, and after which locking operation the carrier will support the said wheel for movement over the ground.

Heretofore emergency carriers intended for use in supporting a wheel and tire on a vehicle for movement over the ground to a suitable place for effecting the necessary repair and replacement of the tire or wheel, have been suggested, but insofar as I am aware they have not been satisfactory for many reasons, such as: failure to take the weight off the injured tire; failure to stay in correct wheel and tire supporting position particularly where used on a front wheel that constitutes one of the steering wheels; difficulty in securing in correct wheel supporting position at the start; excessive bulk and weight, and objectionable complexity and cost of manufacture.

Several objects of this invention are to overcome each of the above objections, and still further objects and advantages will appear in the description and in the drawings.

In the drawings:

Fig. 1 is a side elevational view of a carrier illustrative of one form of the invention, said view being partially broken away to disclose structure that otherwise would not clearly show.

Fig. 2 is an enlarged sectional view taken along line 2—2 of Fig. 1 and which view indicates in dot-dash line the section of a tire and rim in the carrier in the position in which they would be in actual operation of the carrier.

Fig. 3 is a sectional view taken along line 3—3 of Fig. 1, but with the axle, wheels and bearing shown in elevation instead of in section.

Fig. 4 is a reduced cross sectional view of a carrier having a different form of locking means than is shown in Fig. 2. The sectional view in this form of the invention is taken in substantially the same place with respect to the carrier as Fig. 2.

In detail the carrier of this invention as illustrated in Figs. 1 to 3 inclusive comprises a sort of cradle in the form of an elongated, generally upwardly opening channel that is separated tranversely thereof to provide one channel section 1 and another section 2. One end portion of section 1 overlaps the adjacent end portion of section 2 to lie within the latter, and when in this position the channel sections are longitudinally curved to substantially conform to the circumferential curvature of a pneumatic tire that is intended to lie therein, while the transverse contour of the sections substantially conform to the cross sectional contour of the tire casing insofar as the tread and side walls are concerned, but the sides of the channels are preferably flat and in opposed, parallel relationship along their free edges so as to freely admit a casing into the channel through the open side of the latter.

The section 1 is supported from below at a point intermediate its opposite ends on an axle 3 that extends transversely of the section, and which axle has rotatable ground wheels 4 at its opposite ends. The central portion of said axle is downwardly offset relative to the ends that carry the wheels 4, and a bearing 5 (Fig. 3) on section 1 is journalled on said offset portion so that section 1 is swingingly supported on said portion and is relatively close to the ground.

The outer end of section 1, or the end thereof that is remote from section 2 is tapered to a point and the sides 6 of the section 1 commence from said end becoming progressively wider in direction toward the channel 2 until they are substantially the same width as the sides of channel 2 at the end portion of section 1 that lies within section 2.

Upon swinging the end of section 1 that is within section 2 upwardly on the axle 3 to the dotted line position 7 (Fig. 1) the pointed end of section 1 will be adapted to engage the ground at a point below a deflated tire, and as the section 1 is quite shallow adjacent said end, there will be no objectionable interference by the sides 6 of the channel section with the abnormally flattened lower portion of the deflated tire, hence no damage can result to the tire.

While the operation of the carrier will be later on described in detail, it might be said at this point that the section 1 is moved to dotted position 7 and is then placed against the tire with the pointed end between the tire and the road in the initial posittion of the carrier when employed for supporting the tire and wheel carrying the same.

The sides of section 2 are of substantially uniform width and said section is rigidly secured in any suitable manner to and between side frame members 8 of a horizontally extending substantially U-shaped frame. Said members 8 are journalled at their free ends on the ends of axle 3 between the wheels 4 and the centrally offset portion of said axle (Fig. 3). From said free ends the side members extend horizontally and parallel toward section 2 to the point where sections 1 and 2 overlap, and from said point said side members extend upwardly and then again horizontally outwardly beyond section 2 where they are joined. Section 2 extends almost vertically upwardly from a point almost level with the closed end of the said frame that is adjacent but outwardly of the outer end of section 2, said outer end being the end remote from section 1.

Within the closed end portion of the frame that carries section 2 is a bearing 9 for the vertical upwardly extending shaft 10 of a caster ground wheel 11. The axle for wheel 11 is offset to one side of the vertical axis of the shaft 10 and said axle is carried at its ends in the lower ends of yoke 12 that is secured to shaft 10 and between the sides of which yoke the wheel is positioned. Thus wheel 11 will swivel automatically when leading the wheels 4 or when following such wheels when the cradle is turned by reason of a change in direction of the wheel that is carried by the cradle due to change in the direction of the vehicle.

The shaft 10 preferably projects upwardly above the cradle frame a sufficient distance to enable manual turning of the shaft 10 and swivelling of wheel 11 by manual manipulation of handle or knob 12 that is on the upper end of said shaft for a purpose later described.

The end portion of section 1 that lies within the adjacent end portion of section 2 is formed with a row of spaced slots 13 that extend in the direction of the width of sides 6 or transversely of the length of section 1. Within each slot 13 is an elongated rim engaging member 14. These members 14 resemble strips having their flat sides perpendicular to sides 6 and they are pivotally secured at their lower ends between lugs 15 that are secured to the bottom of section 1 adjacent sides 6; therefore they are adapted to extend outwardly through the lower ends of slots 13 at their lower ends to the pivots 16 that are carried by lugs 15 and that pivotally support said members 14. The members 14 are substantially wider than the thickness of sides 6; therefore they are adapted to project inwardly into the channel of section 1 when their outer edges are flush with the outer surfaces of sides 6 (Fig. 2). Section 2 is formed with inwardly opening recesses in thickened portions 17 (Fig. 1) of its sides where the lower ends of members 14 extend outwardly of the section 1 so as to receive the said lower ends including lugs 15. However, the recess does not extend to the upper ends of the members 14 in the position shown in Fig. 2; therefore when the section 1 is moved into section 2 as in Figs. 1, 2, the sides of section 2 will automatically move the members to the position indicated in Fig. 2 in which they project into the channel section 1.

The upper ends of members 14 are formed with recesses 18 on their edges that face into the channel section, and these recesses are adapted to receive the edges of rim 19 of the vehicle wheel and to support the rim a sufficient distance from the bottom of the channel section 2 so as to prevent the weight of the vehicle from being taken by the casing 20. In Fig. 2 the said rim and casing are shown in dot-dash line.

The recesses 18 in members 14 are arranged relative to each other and to the rim 19 so that each will engage the rim to support the same from points substantially below the axle of the vehicle wheel that carries the rim when the section 1 is in wheel carrying position as seen in full line in Fig. 1.

When the adjacent ends of sections 1, 2 are together as in Fig. 2 it will be seen that the upper edges of the recesses 18 extend over the rim 19 thereby locking the rim to said members 14 and to the cradle and the resiliency of the tire 20 will tend to hold the outer edges of members 14 against the adjoining side of section 1. This latter side of said section may be formed with recesses 21 for receiving relatively slight projections 22 on the said outer edges of members 14 thereby frictionally locking the sections 1, 2 together as shown in Fig. 2. The lower edges 23 of recesses 18 may be slightly inclined so that the weight of the vehicle on the said members 14 will tend to automatically force the latter outwardly so that projections 22 will be firmly seated in recesses 21 until the weight of the vehicle is removed from the said members by removal of the wheel at the place where the tire is to be repaired or replaced.

In operation the carrier is positioned in front of a front tire or behind a rear tire with the section 1 adjacent whichever one of such tires is deflated, and said section is tilted to the position 7 (Fig. 1) to lie against the tire with the toe of the section, or pointed end of said section between the tire and the ground. The wheel 11 is then turned cross-wise relative to the length of the cradle so that force exerted against section 1 will not move the carrier. The section 1 thus becomes an inclined ramp, and upon moving the vehicle against the carrier the wheel will automatically move over axle 3 and section 1 will automatically pivot on said axle to the full line position of Fig. 1. The members 14 are automatically moved inwardly by the sides of section 2 into rim engaging position and are automatically locked to the rim. Preferably there is sufficient frictional resistance to the swinging of members 14 on their pivots to prevent objectionable unobstructed swinging of the members by gravity, although with the channel section 1 in the dot-dash position 7 in Fig. 1, the said members 14 can be manually adjusted for engaging the sides of the tire and for properly entering the section 2 should they become undesirably displaced in moving to said position. The casing 20 being within the channel sections 1, 2 the latter will be positively held against any tendency to become misaligned relative to the said casing. Also caster wheel 11 will automatically swivel to enable the cradle to remain in proper position with the casing and vehicle wheel when the latter changes direction.

The principal difference between the device of Fig. 4 and that of the figures already described, is that manual screw actuated locking lugs 25 are provided for engaging and supporting the rim 19. These lugs may be relatively wide in the direction of the length of the cradle to provide a strong support for the rim, and they are each formed with a recess 26 for locking the rim against upward movement relative to the cradle. This form of the invention merely substitutes a manually actuated locking means for the automatic locking means of Figs. 1 and 2 and may be used where the vehicle to be moved is on abnormally rough roads and must be moved a fairly long distance, although it may be used anywhere if desired.

In the different forms the invention may take it is preferable that the wheels 4, 11 be provided with solid rubber tires or other resilient material having characteristics similar to that of rubber. The other parts of the carrier may be of aluminum or any other metal or metal alloys, it being preferable that the metals be as light in weight as is consistent with the necessary strength.

The carrier is sufficiently light to be readily carried manually, or on a motorcycle, in which latter instance the operator may attach the motorcycle to the vehicle after placing the carrier under the desired wheel, and then drive the vehicle to the service station, garage or to any other suitable place for effecting the repair or replacement. Or the driver of the vehicle may carry the carrier in the vehicle as a piece of emergency equipment.

One of the very important features of this invention is the provision of the swivelly supported wheel 11 that both functions to automatically follow the changes in direction of the vehicle wheel carried in the cradle so as to always be aligned with the vehicle wheel, and to secure the carrier against movement when it is turned crosswise relative to the length of the cradle so as to expedite the securing of the cradle and vehicle wheel together with the cradle supporting the wheel and that portion of the weight of the vehicle normally carried by the tire on said wheel.

It is to be understood that the drawings and description are not to be considered restrictive of the invention, as they are merely illustrative of preferred forms thereof.

I claim:

1. A carrier for supporting a deflated rim-mounted pneumatic tire that is on a vehicle for movement over the ground with the weight of the vehicle off said tire comprising ground wheels and rim engaging means carried thereby for engaging the rim carrying such tire and for supporting said rim a sufficient distance above the ground to relieve the tire thereon of the weight of the vehicle, locking means for releasably securing said rim to said rim engaging means against accidental release of said rim therefrom, means supporting said locking means for movement into and out of locking relation with said rim, means automatically actuated by relative movement of the tire and carrier to the position in which said rim engaging means so supports said rim for moving said locking means into said locking relation.

2. A carrier for supporting a deflated rim-mounted pneumatic tire that is on a vehicle for movement over the ground with the weight of the vehicle off said tire comprising ground wheels and rim engaging means carried thereby for engaging the rim carrying such tire and for supporting said rim a sufficient distance above the ground to relieve the tire thereon of the weight of the vehicle, an axle for a pair of said wheels, a ramp carried by said axle and pivotally supported thereon at a point below the horizontal axis of said pair of wheels for swinging from an inclined position relative to horizontal with its lower end between the deflated tire and the ground to a position clear of the ground for elevating said tire off the ground upon movement of the tire over said ramp, said rim engaging means being on said ramp, and means for securing said ramp clear of the ground with said tire in a position over the same.

3. A carrier for supporting a deflated rim-mounted pneumatic tire that is on a vehicle for movement over the ground with the weight of the vehicle off said tire comprising ground wheels and rim engaging means carried thereby for engaging the rim carrying such tire and for supporting said rim a sufficient distance above the ground to relieve the tire thereon of the weight of the vehicle, a ramp carried by said wheels and pivotally supported by swinging from an inclined position relative to horizontal with its lower end between the deflated tire and the ground to a position clear of the ground for elevating said tire off the ground upon movement of the tire over said ramp, and means for securing said ramp clear of the ground with said tire in a position over the same, said rim engaging means being carried by the elevated end of said ramp when the latter is in said inclined position and adjacent the rim of the tire to be elevated.

4. A carrier for supporting a deflated rim-mounted pneumatic tire that is on a vehicle for movement over the ground comprising a wheel mounted cradle, said cradle being an elongated generally upwardly opening channel member substantially conforming in longitudinally and in cross-sectional contour to the circumferential and cross-sectional contour of a tire, said member being separated transversely thereof into a pair of sections one of which fits within the other at their adjacent ends, an axle supporting a pair of said ground wheels coaxial, said axle extending transversely below said one of said sections intermediate the ends of said section, means pivotally securing said one to said axle for swinging the end thereof remote from said other section toward the ground to provide a ramp for the tire to be carried by said carrier when said ends of said sections are so fitted one within the other.

5. A carrier for supporting a deflated rim-mounted pneumatic tire that is on a vehicle for movement over the ground comprising a wheel mounted cradle for such tire having rim engaging means therein for engaging the rim of such tire and for supporting the said rim and the weight of the car normally carried by said tire, said cradle including elevating means for automatically elevating such tire and rim to the position in which said rim engaging means supports the said rim upon relative horizontal movement between said cradle and said rim.

6. A carrier for supporting a deflated rim-mounted pneumatic tire that is on a vehicle for movement over the ground comprising a wheel mounted cradle for such tire having rim engaging means therein for engaging the rim of such tire and for supporting the said rim and the weight of the car normally carried by said tire, said cradle including elevating means for automatically elevating such tire and rim to the position in which said rim engaging means supports the said rim upon relative horizontal movement between said cradle and said rim, means mounting said elevating means for movement relative to said wheels during actuation thereof for so elevating said tire and rim, and locking means actuated by said movement of said elevating means for releasably locking said rim against dislodgment from its elevated position.

7. A carrier for supporting a deflated rim-mounted pneumatic tire that is on a vehicle for movement over the ground with the weight of the vehicle off said tire comprising a frame and ground wheels supporting said frame for movement over the ground, a cradle in the form of an elongated channel substantially conforming longitudinally thereof to the circumferential curvature of a tire and being curved transversely to generally conform to the cross-sectional contour of a tire, said cradle being transversely divided to provide a pair of sections, one section of said pair being rigid with said frame and the other section of said pair being pivotally connected with said frame at a point intermediate its ends for swinging of the end thereof remote from said one section to the ground for providing an inclined ramp over which a tire is adapted to be moved for supporting the tire on said carrier, and means on said one section for engaging the rim mounting said tire and for supporting said rim spaced above the bottom of said cradle during said movement of said tire.

8. A carrier for supporting a deflated rim-mounted pneumatic tire that is on a vehicle for movement over the ground with the weight of the vehicle off said tire comprising a frame and ground wheels supporting said frame for movement over the ground, a cradle in the form of an elongated channel substantially conforming longitudinally thereof to the circumferential curvature of a tire and being curved transversely to generally conform to the cross-sectional contour of a tire, said cradle being transversely divided to provide a pair of sections, one section of said pair being rigid with said frame and the other section of said pair being pivotally connected with said frame at a point intermediate its ends for swinging of the end thereof remote from said one section to the ground for providing an inclined ramp over which a tire is adapted to be moved for supporting the tire on said carrier, and means on said one section for engaging the rim mounting said tire and for supporting said rim spaced above the bottom of said cradle during said movement of said tire, an axle for one pair of said ground wheels secured to said frame, and said other section being pivoted on said axle for said swinging thereof.

RUSSEL E. FOLDEN.

REFERENCES CITED

The following references are of record in the file of this patent:

UNITED STATES PATENTS

| Number | Name | Date |
|---|---|---|
| 857,660 | Norwood | June 25, 1907 |
| 1,184,291 | Wilson | May 23, 1916 |
| 2,226,521 | McNamara | Dec. 24, 1940 |
| 2,247,717 | Sutter | July 1, 1941 |
| 2,254,564 | Caslake | Sept. 2, 1941 |

FOREIGN PATENTS

| Number | Country | Date |
|---|---|---|
| 334,852 | France | Nov. 5, 1903 |
| 465,000 | France | Jan. 26, 1914 |